United States Patent [19]

Müller

[11] Patent Number: 5,549,025
[45] Date of Patent: Aug. 27, 1996

[54] CUTTING STRIP WITH A CUTTING EDGE MADE OF HIGHLY WEAR-RESISTANT MATERIAL

[75] Inventor: Leo Müller, Bessenbach, Germany

[73] Assignee: Rieter Automatik GmbH

[21] Appl. No.: 288,225

[22] Filed: Aug. 9, 1994

[30] Foreign Application Priority Data

Aug. 26, 1993 [DE] Germany ............... 43 28 778.6

[51] Int. Cl.⁶ ............................................. B26D 1/09
[52] U.S. Cl. ........................... 83/694; 83/698.11; 83/955
[58] Field of Search ......................... 83/699.11, 955, 83/694, 349

[56] References Cited

U.S. PATENT DOCUMENTS

| | | | |
|---|---|---|---|
| 1,529,971 | 3/1925 | Vance | 83/699.11 |
| 3,214,106 | 10/1965 | Gorman . | |
| 4,036,095 | 7/1977 | Huber et al. | 83/674 |
| 4,319,507 | 3/1982 | Kondo et al. | 83/699.11 |

FOREIGN PATENT DOCUMENTS

| | | |
|---|---|---|
| 0111038 | 6/1984 | European Pat. Off. . |
| 2536691 | 6/1984 | France . |
| 2152615 | 4/1973 | Germany . |
| 2349697 | 4/1974 | Germany . |
| 3108954C2 | 9/1982 | Germany . |
| 3605363 | 8/1987 | Germany . |
| 3611179 | 4/1988 | Germany . |
| 1588558 | 4/1981 | United Kingdom . |

*Primary Examiner*—Kenneth E. Peterson
*Attorney, Agent, or Firm*—Banner & Allegretti, Ltd.

[57] ABSTRACT

The invention refers to a cutting strip with a cutting edge of highly wear-resistant material, e.g., polycrystalline diamond material, that is laid in solid connection on a base and forms a rail piece together with this base, whereby several rail pieces are laid in series along a holder that is made of wear-resistant material, e.g., hard metal, and has an essentially rectangular cross-section. The holder is provided, along two adjacent edges each with a groove protruding diagonally into the holder, with essentially parallel faces into which the rail pieces are inserted in such a way that the faces of the two grooves reach to the cutting edge of the rail pieces, whereby the faces situated between the two grooves are formed by a clamping piece that can be screwed onto the holder and that collectively clamps against the holder all rail pieces held in the two grooves.

1 Claim, 1 Drawing Sheet

U.S. Patent        Aug. 27, 1996        5,549,025
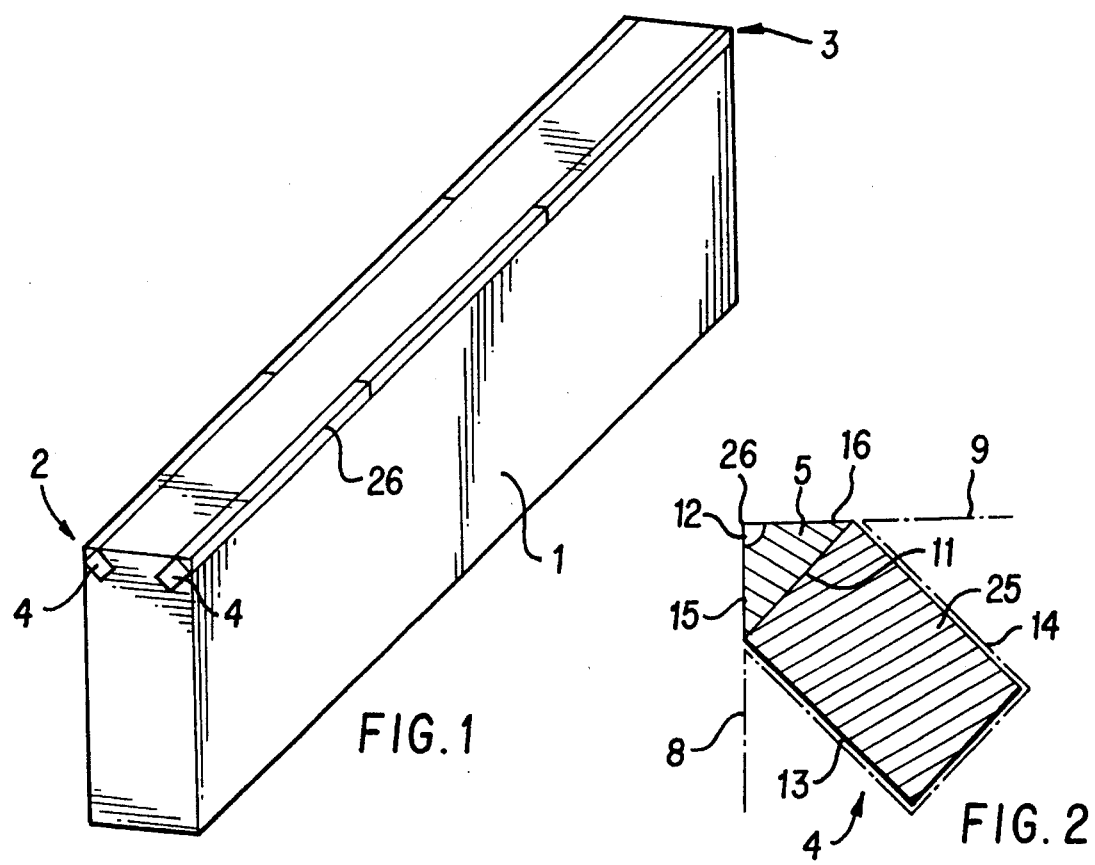
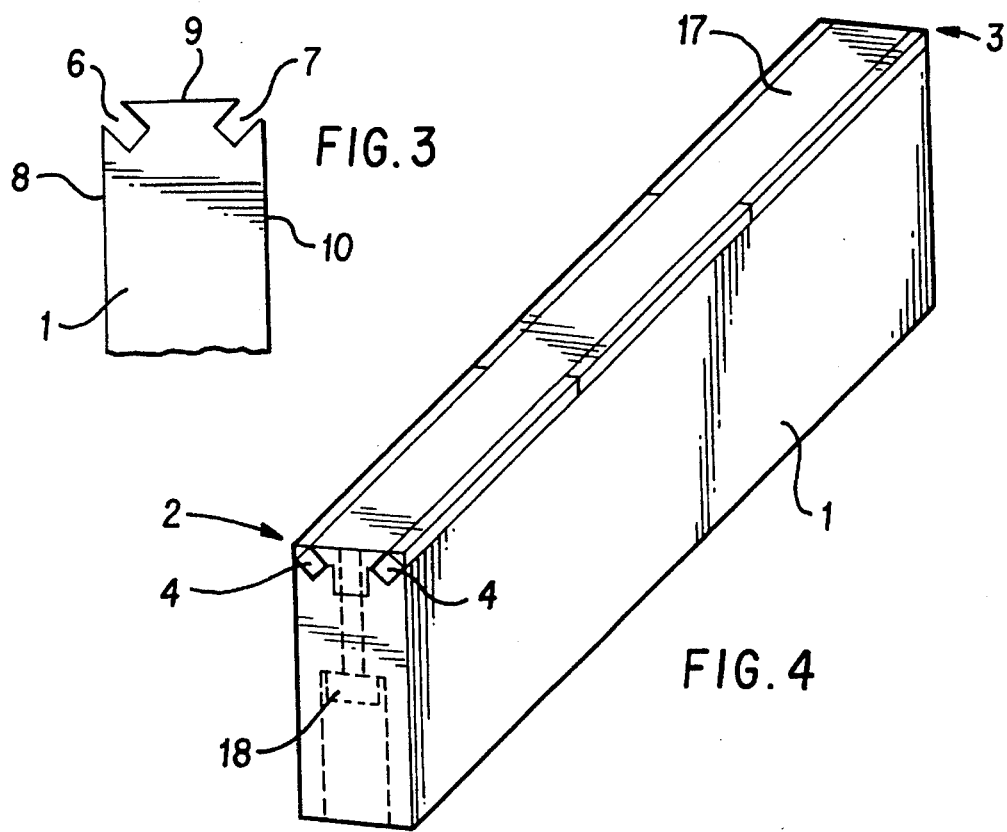

CUTTING STRIP WITH A CUTTING EDGE MADE OF HIGHLY WEAR-RESISTANT MATERIAL

The invention refers to a cutting strip with a cutting edge made of highly wear-resistant material, e.g., polycrystalline diamond material, that is laid in solid connection on a base and forms a rail section with this base. Several rail sections are laid in series along a holder that is made of wear-resistant material, e.g., hard metal, and has an essentially rectangular cross-section.

Such a cutting strip is known from German Patent DE-PS 31 08 954. The cutting strip disclosed in that patent is characterized by a three-piece construction, namely such that a hard metal seat (base) with a cutting edge is attached on its own short support, which is in turn mounted along a holder. By lining up same-shaped supports in series with the hard metal seats along the holder, the cutting strip is formed altogether. In addition, the holder is provided with a recess running along one of its edges. This recess is formed by two faces abutting against each other at right angles. These faces in turn run into the concerned walls of the holder. By the lining up in series of several supports which can be screwed onto the holder individually, individual parts of the cutting strip are able to be replaced. This is particularly necessary if damage occurs to a single spot on the cutting strip. In this event, only the respective support needs to be replaced.

Furthermore, a cutting strip is being offered and sold in which, instead of same-shaped supports being lined up in series, a single, continuous support is provided for the entire cutting strip. In this case, the hard metal seat with its cutting edge extends continuously over the entire support. In addition, the support has along one of its edges a recess with two faces abutting against each other (as in the object of German Patent DE-PS 31 08 954), into which the hard metal seat is soldered. This type of attachment exposes the materials used to considerable thermal stress, which can lead to the formation of tears in the brittle materials used here, which in turn leads to bursts in the cutting edge and thus to reduction of tool life.

In another cutting edge holder for cutting machines with rotary cutting edges, known from German Patent DE-OS 23 49 697, a rail piece made of highly wear-resistant material is inserted along the edge of a holder that has a rectangular cross-section. For this purpose, the holder contains along this edge a recess for the rail section, which projects diagonally into the holder, and a clamping piece with which the rail section is clamped tight against the holder.

The invention is based on the task of simplifying the construction of the known cutting strip and improving the attachment of the hard metal seat or, as the case may be, the rail section. According to the invention, this takes place by the holder being provided, along two adjacent edges each with a groove projecting diagonally into the holder, with essentially parallel faces into which the rail sections are laid in such a way that the faces of the two grooves reach to the cutting edge of the rail sections, whereby the faces situated between the two grooves are formed by a clamping piece that can be screwed onto the holder; this clamping piece collectively clamps against the holder all rail sections held in the two grooves.

Because the rail sections are received into the groove projecting diagonally into the holder, with its essentially parallel faces, the holders are supported on both sides by the faces of the groove and are held in the groove, whereby in particular a cutting pressure acting on the cutting edge, for example stemming from a rotating granulator cutter, presses the holders into the groove because of its diagonal position, and thus against its base. Stress on the cutting strip thus ensures also its position in the holder receiving it, without its requiring in the process the support required in the object of German Patent DE-PS 31 08 954. The design of the seat for the rail sections as a diagonal groove with the essentially parallel faces moreover allows to have the faces reach to the cutting edge of the rail sections, in such a way that the material of the rail section remains covered This is significant because the material of the base supporting the cutting edge, for which, in order to make a secure connection with the cutting edge, no particularly wear-resistant material can be used, is not at all exposed to wear because of this covering. On the other hand, the holder that has the rail section can be designed of wear-resistant material, since it does not have to be exposed to any thermal or other stresses during the attachment of the rail sections. This results in a particularly wear-resistant arrangement of a cutting strip which, above and beyond this, is distinguished by the fact that it only needs to have a small extent along its surface; namely, it only covers the opening of the groove, practically speaking. Only a little material is thus needed for the rail sections with their cutting edge.

It should also be pointed out that German Patent DE-PS 36 11 179, FIG. 2, makes known a cutting strip in which a cutting insert of a single block made of a ceramic material is cemented in place in a diagonal groove of a holder. The publication does not disclose anything on the attachment, subject to particular requirements, of a cutting strip with cutting edge of highly wear-resistant material.

An advantageous design of the groove and the cutting edge consists of the groove being fixed along the edge in such a way that its faces run essentially symmetrically to the edge, into the holder's walls leading to the edge. In connection with this, the cutting edge forms in its cross-section a triangle whose base runs crosswise to the rail section and whose angle opposite the base forms an essentially right angle, in such a way that the cutting edge formed by it runs parallel to the rail section and roughly axially to it. This design results in a rail section that is particularly thrifty with material. In connection with this, the triangular cross-section of the cutting edge gives it a roof-shaped design, the roof-sides of which verge into the concerned walls of the holder and form the cutting edge at the point where they run together. For the rail sections with their cutting edge, this results in a particularly small cross-section and thereby a particularly good material utilization.

Because of the symmetric arrangement of the grooves to the edges of the holder, the clamping attachment for the various rail sections can be achieved in advantageous manner, namely in that at any given time, a face of the groove is formed by the clamping piece that can be screwed onto the holder. When the clamping piece is removed, the concerned face of the groove is also removed, in such a way that the groove opens on one side. Rail sections can then be taken out of the remaining part of the groove and new rail sections can be inserted, thus resulting in easy ability to replace worn-out rail sections.

Because the cutting strip is provided with the groove along several of its edges, resulting in a support with several cutting edges, namely along all edges along which the aforementioned rail sections are inserted into a groove, a holder whose cutting edge provided along one edge is worn out only needs to be turned around and inserted again into the concerned contrivance, whereby a new, unused cutting edge is presented to the material to be cut. This can be repeated as many times as edges on the holder are provided with rail sections, taking as a basis the essentially rectangular cross-section of the holder, i.e., a maximum of four times.

Forms of construction of the inventions are illustrated in the figures. The following are shown:

FIG. 1 a perspective view of a holder with rail sections arranged symmetrically along two edges, FIG. 2 enlarged, a rail section made of the arrangement according to FIG. 1 in cross-section, FIG. 3 enlarged, a face view of the holder without rail sections, FIG. 4 a design of a holder similar to the arrangement in FIG. 1 with a clamping piece for attaching the rail sections.

FIG. 1 shows the holder 1 in basic construction without the clamping piece, which is shown in FIG. 4. The holder has a rectangular cross-section. It can be used as cutting strip in granulators for granulating plastics, for example. Such a use is shown in particular in FIG. 2 of the above-mentioned German Patent DE-PS 36 11 179. Along two of its edges, the holder 1 is provided with three rail sections 4 lined up directly in series, which are laid into grooves 6 and 7 that are shown in FIG. 3. The grooves 6 and 7 are inserted at a 45 degree angle along the concerned edge 2 or 3 (FIG. 1) into the holder 1, in such a way that their faces run essentially symmetrically to the edge 2 or 3 into the walls 8 and 9 or 9 and 10 leading to the concerned edge. As FIG. 2 shows, the rail sections 4 consist of bases 25 and cutting edges 5 connected with them, which are made of a known, highly wear-resistant material. In the illustrated form of construction, the cutting edges 5 form a triangle in their cross-section. The triangle's base 11 is solidly connected with a front side of the base 25 and the triangle's angle 12 opposite its base 11 forms a right-angle as cutting edge 26 at this point.

The rail sections 4 completely fill out the grooves 6 and 7, whereby the faces 13 and 14 of the grooves 6 and 7 (see dot-dash line in FIG. 2) reach to the cutting edge 5. This means that the adjacent walls 8 and 9 of the holder 1 (shown as dot-dash in FIG. 2) also reach to the cutting edge 5, in such a way that there is an uninterrupted transition from both lateral sides 15 and 16 of the cutting edge to the walls 8 and 9. This is significant because the material of the rail piece 4 might be softer than the material of the holder 1. The harder material of the holder 1 (compared to the rail section 4) is then directly adjacent to the material of the particularly hard, wear-resistant cutting edge, in such a way that the arrangement is designed especially wear-resistant along the edges 2 and 3 of the holder 1.

The diagonal position of the grooves 6 and 7, due to a cutting pressure acting on the cutting edges 5, causes a pressing in of the cutting edges 5 with the rail sections into the grooves 6 and 7, in such a way that they cannot slip out of the grooves. As regards the forces occurring in the process and their directions, the above-mentioned German Patent DE-PS 36 11 179 is additionally referred to.

FIG. 4 shows the completed construction compared to the arrangement according to FIG. 1. Along its face-side enclosing the edges 2 and 3, the holder 1 according to FIG. 1 has the clamping piece 17 which, as indicated by the screw 18, can be tightened against the holder 1. Along its outer sides, the clamping piece 17 forms the respective inward faces of the grooves 6 and 7 (face 14 in FIG. 2). Together with the inserted clamping piece 17 illustrated in FIG. 4, the grooves 6 and 7 (see FIG. 3) are then formed into which the rail sections 4 are inserted. The rail sections 4 with their cutting edges 5 correspond to the same components according to FIGS. 1 and 2.

By loosening the screw 18, the clamping piece 17 can be removed, whereby the rail sections 4 become accessible and can be removed from the holder 1. It is then possible to insert new rail sections, whereupon the clamping piece 17 is to be screwed on again, thereby pressing the rail sections against the holder 1.

It should be pointed out that in the illustrated holders 1, it is obviously also possible to provide all four edges with the rail sections.

I claim:

1. A cutting strip with a plurality of cutting layers made of highly wear resistant material, said layers are respectively laid in solid connection on a respective base to form plurality of rail pieces, and said plurality of rail pieces are laid in series along a holder that is made of wear-resistant material and has an essentially rectangular cross-section, characterized in that the holder is provided with two adjacent edges, each with a groove protruding diagonally into the holder, each said groove having essentially parallel faces into which the rail pieces are inserted in such a way that the faces of the two grooves reach to the cutting layers of the rail pieces, the grooves are positioned in the holder such that their faces extend essentially symmetrically with respect to their respective cutting layers, and the faces situated between the two grooves are formed by a clamping piece that can be screwed onto the holder and that collectively clamps against the holder all rail pieces held in the two grooves, and the screwing of the clamping piece onto the holder takes place by a screw tightening the clamping piece against the holder which screw traverses the holder and is turned from a side of the holder opposite the clamping piece, and wherein each cutting layer forms in its cross-section a triangle whose base runs crosswise to the rail piece and whose angle opposite its base forms an essentially right angle in such a way that a cutting edge formed by it runs parallel to the rail piece and is centered such that the rail piece has a symmetrical cross section.

* * * * *